(12) United States Patent
Ke et al.

(10) Patent No.: US 11,985,072 B2
(45) Date of Patent: May 14, 2024

(54) MULTIMEDIA DATA STREAM PROCESSING METHOD, ELECTRONIC DEVICE, AND STORAGE MEDIUM

(71) Applicant: Beijing Baidu Netcom Science Technology Co., Ltd., Beijing (CN)

(72) Inventors: Yugang Ke, Beijing (CN); Chongming Gu, Beijing (CN); Zhoufeng Wang, Beijing (CN); Junwen Gao, Beijing (CN); Weihui Liu, Beijing (CN); Minglu Li, Beijing (CN); Feifei Cao, Beijing (CN); Yongqiang Wu, Beijing (CN); Xiaoen Zhu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/100,303

(22) Filed: Jan. 23, 2023

(65) Prior Publication Data
US 2024/0098037 A1    Mar. 21, 2024

(30) Foreign Application Priority Data
Sep. 15, 2022    (CN) .......................... 202211121691.1

(51) Int. Cl.
*H04L 47/70* (2022.01)
*H04L 65/60* (2022.01)
(Continued)

(52) U.S. Cl.
CPC .............. *H04L 47/82* (2013.01); *H04L 65/60* (2013.01); *H04L 65/65* (2022.05); *H04L 67/02* (2013.01);
(Continued)

(58) Field of Classification Search
None
See application file for complete search history.

(56) References Cited

U.S. PATENT DOCUMENTS 8,855,059 B2 * 10/2014 Garudadri ............... H04L 65/80
                                                           455/450
10,114,882 B2 * 10/2018 Lipstone ................. H04L 67/10
(Continued)

FOREIGN PATENT DOCUMENTS

CN          107277134 A       10/2017
CN          109495505 A        3/2019
(Continued)

OTHER PUBLICATIONS

Jun. 28, 2023—(CN) Office Action—App. No. 2022111216911.

*Primary Examiner* — Lashonda Jacobs-Burton
(74) *Attorney, Agent, or Firm* — Banner & Witcoff, Ltd.

(57) ABSTRACT

Provided is a multimedia data stream processing method, an electronic device and a storage medium, relating to the field of artificial intelligence, and specifically, to the technical fields of cloud computing, media cloud technology, and the like, which may be applied to scenes such as smart cloud. The multimedia data stream processing method includes: allocating a plurality of sub-streams of a multimedia data stream to a plurality of edge resource nodes, where the multimedia data stream is segmented into a plurality of slices and each of the plurality of sub-streams includes a part of the plurality of slices of the multimedia data stream; and scheduling the plurality of edge resource nodes to provide the plurality of sub-streams of the multimedia data stream for a terminal device.

20 Claims, 4 Drawing Sheets

(51) Int. Cl.
    *H04L 65/65*         (2022.01)
    *H04L 67/02*         (2022.01)
    *H04L 67/10*         (2022.01)
    *H04N 21/218*       (2011.01)
    *H04N 21/2187*     (2011.01)
    *H04N 21/231*       (2011.01)

(52) U.S. Cl.
    CPC .......... *H04L 67/10* (2013.01); *H04N 21/2181* (2013.01); *H04N 21/2187* (2013.01); *H04N 21/23103* (2013.01)

(56) References Cited

U.S. PATENT DOCUMENTS

| | | | | |
|---|---|---|---|---|
| 11,132,721 | B1* | 9/2021 | Uthaman | G06F 16/958 |
| 11,431,770 | B2* | 8/2022 | Huang | H04L 65/765 |
| 2013/0132602 | A1* | 5/2013 | El-Beltagy | H04N 21/632 709/231 |
| 2015/0310577 | A1* | 10/2015 | Cabasse | G06T 1/20 345/522 |
| 2018/0262351 | A1* | 9/2018 | Liu | H04L 67/34 |
| 2019/0268393 | A1* | 8/2019 | Panagos | H04L 65/65 |
| 2020/0244753 | A1* | 7/2020 | Wang | H04L 65/612 |
| 2020/0245042 | A1 | 7/2020 | Jiang et al. | |
| 2020/0304555 | A1* | 9/2020 | Wu | H04L 67/101 |
| 2022/0256205 | A1* | 8/2022 | Hu | H04N 21/6375 |
| 2022/0368776 | A1* | 11/2022 | Paranjpe | H04L 67/5681 |

FOREIGN PATENT DOCUMENTS

| | | |
|---|---|---|
| CN | 113301100 A | 8/2021 |
| CN | 113727199 A | 11/2021 |
| CN | 114666318 A | 6/2022 |

* cited by examiner

MULTIMEDIA DATA STREAM PROCESSING METHOD, ELECTRONIC DEVICE, AND STORAGE MEDIUM

CROSS-REFERENCE TO RELATED APPLICATIONS

The present application claims priority to Chinese Patent Application No. CN202211121691.1, filed with the China National Intellectual Property Administration on Sep. 15, 2022, the disclosure of which is hereby incorporated herein by reference in its entirety.

TECHNICAL FIELD

The present disclosure relates to the field of artificial intelligence, and specifically, to the technical fields of cloud computing, media cloud technology, and the like, which may be applied to scenes such as smart cloud.

BACKGROUND

With the development of cloud computing and media cloud technology, every user can produce multimedia data. For example, in a live streaming platform, each anchor can record multimedia data, and push multimedia data streams to the live platform, such that the multimedia data streams can be distributed to users watching live broadcasts.

Peer-to-Peer (P2P)/P2P Content Delivery Network (PCDN) system aims to effectively utilize the fragmentation bandwidth and computation capability of various edge resources to assist in transmitting and distributing multimedia data streams.

However, the current P2P/PCDN systems all use a private protocol, and a user side needs to install a Software Development Kit (SDK) supporting the private protocol to implement the processing logic of the multimedia data streams.

SUMMARY

The present disclosure provides a multimedia data stream processing method and apparatus, an electronic device and a storage medium.

According to an aspect of the present disclosure, provided is a multimedia data stream processing method, including: allocating a plurality of sub-streams of a multimedia data stream to a plurality of edge resource nodes, where the multimedia data stream is segmented into a plurality of slices, and each of the plurality of sub-streams includes a part of the plurality of slices of the multimedia data stream; and scheduling the plurality of edge resource nodes to provide the plurality of sub-streams of the multimedia data stream for a terminal device.

According to another aspect of the present disclosure, provided is a multimedia data stream processing method, including: acquiring a plurality of sub-streams of a multimedia data stream from a plurality of edge resource nodes in response to a control of a centralized scheduling device, where the multimedia data stream is segmented into a plurality of slices, and each of the plurality of sub-streams includes a part of the plurality of slices of multimedia data; restoring the multimedia data stream based on slices contained in the plurality of sub-streams; and playing the multimedia data stream.

According to still another aspect of the present disclosure, provided is a multimedia data stream processing apparatus, including: an allocation module, configured to allocate a plurality of sub-streams of a multimedia data stream to a plurality of edge resource nodes, where the multimedia data stream is segmented into a plurality of slices, and each of the plurality of sub-streams includes a part of the plurality of slices of the multimedia data stream; and a scheduling module, configured to schedule the plurality of edge resource nodes to provide the plurality of sub-streams of the multimedia data stream for a terminal device.

According to still yet another aspect of the present disclosure, provided is a multimedia data stream processing apparatus, including: a response module, configured to acquire a plurality of sub-streams of a multimedia data stream from a plurality of edge resource nodes in response to a control of a centralized scheduling device, where the multimedia data stream is segmented into a plurality of slices, and each of the plurality of sub-streams includes a part of the plurality of slices of multimedia data; a restoration module, configured to restore the multimedia data stream based on slices contained in the plurality of sub-streams; and a play module, configured to play the multimedia data stream.

According to still yet another aspect of the present disclosure, provided is an electronic device, including: at least one processor; and a memory connected in communication with the at least one processor. The memory stores an instruction executable by the at least one processor, and the instruction, when executed by the at least one processor, enables the at least one processor to execute the multimedia data stream processing method.

According to still yet another aspect of the present disclosure, provided is a non-transitory computer-readable storage medium storing a computer instruction thereon, and the computer instruction is used to cause a computer to execute the multimedia data stream processing method.

According to still yet another aspect of the present disclosure, provided is a computer program product including a computer program, and the computer program, when executed by a processor, implements the multimedia data stream processing method.

According to the solution of the embodiments, the multimedia data stream is segmented into the plurality of different sub-streams so as to fully utilize the fragment bandwidth and the computing power of the plurality of edge resource nodes. The terminal device may communicate with different cloud services through a universal communication protocol without integrating SDK, and various cloud services may be communicated without being independent of each other.

It should be understood that the content described in this part is not intended to indicate critical or essential features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of embodiments of the present disclosure to facilitate understanding, and should be considered as merely exemplary. Therefore, those having ordinary skill in the art should realize, various changes and modifications may be made to embodiments described herein, without departing from the scope and spirit of the present disclosure. Likewise, for clarity and conciseness, descriptions of well-known functions and structures are omitted in the following descriptions.

The terms "first", "second", and the like in the description embodiments and claims of the present disclosure and the above-described drawings are intended to distinguish between similar elements, and not necessarily to describe a particular sequential or chronological order. Furthermore, the terms "comprise", "comprising", "include", and "including", as well as any variations thereof, are intended to cover a non-exclusive inclusion; for example, a series of steps or elements is included. The methods, systems, products or devices are not necessarily limited to the explicitly listed steps or elements, but may include other steps or elements not expressly listed or inherent to such processes, methods, products, or devices.

An edge resource node according to an embodiment of the present disclosure includes an edge device at cloud end close to a user side, and a sunk edge resource. The sunk edge small resource may have a public network IP or not have a public network IP, including, for example, a home router, a set-top box, a Personal Computer (PC), a printer, a smart television, and the like.

In the related art, the flow of processing the multimedia data stream generally includes: slicing the multimedia data stream; and receiving and carrying these slices and providing them to a terminal device by a respective edge resource node. The terminal device requests for the edge resource node to acquire the slice through a private protocol by using the SDK. When a problem occurs, the SDK at the terminal device is responsible for scheduling to switch nodes providing the multimedia data stream.

However, when employing cloud services provided by various developers, the terminal device is required to deploy the SDK of each developer. Since the terminal device integrates a large number of SDKs, the resource configuration burden of the terminal device is increased. Further, each SDK can only access the relevant edge resource node, resulting in that various cloud services cannot be communicated and are independent of one another, and thus the edge resource nodes cannot be fully utilized, and resource waste is brought to a certain extent.

Figure 1:
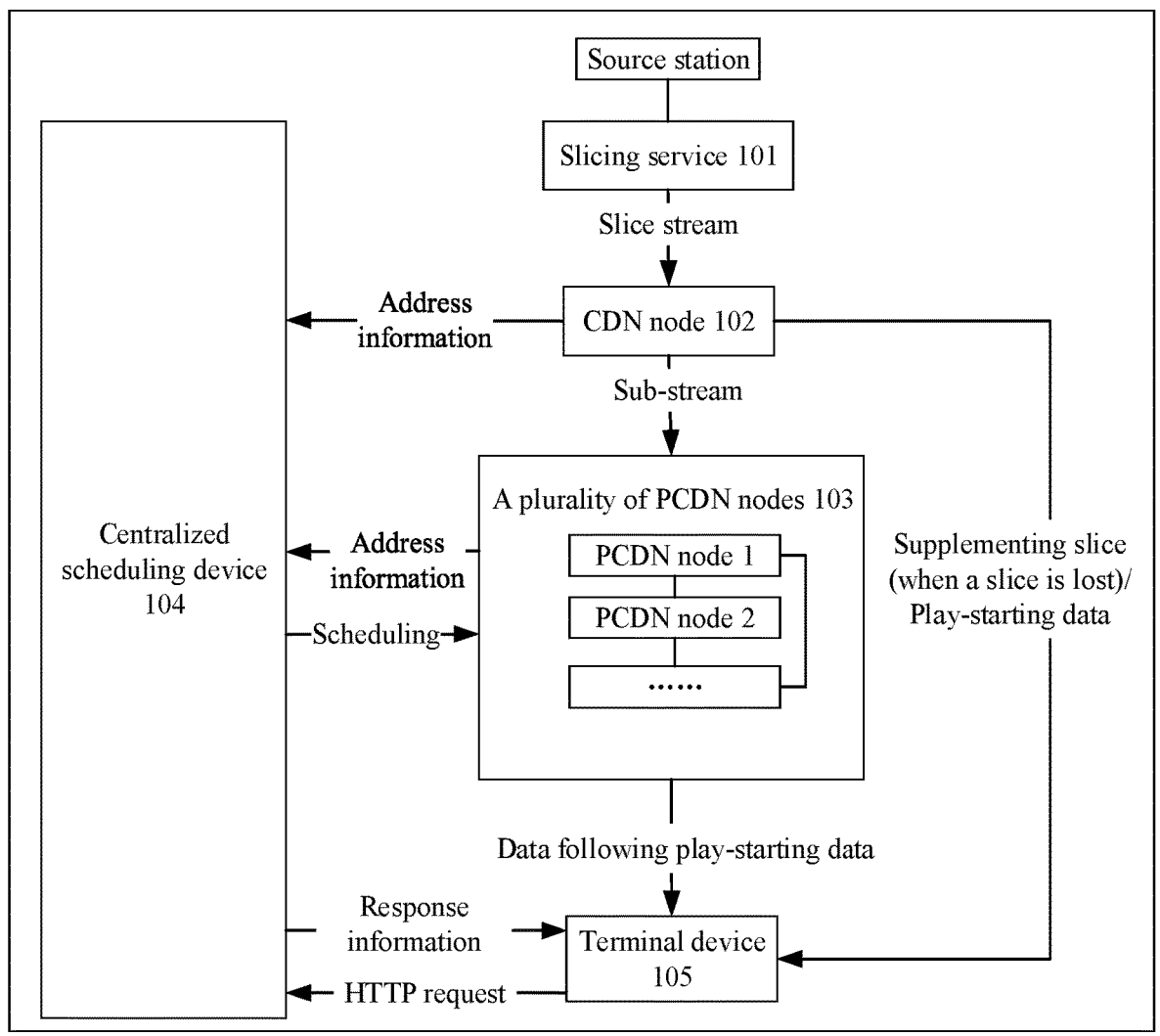
FIG. 1 is a schematic diagram illustrating a system architecture of a multimedia data stream processing method according to an embodiment of the present disclosure.

In view of this, if the edge resource node may be accessed instead of the SDK, more idle edge resource nodes may be utilized reasonably and effectively. To achieve this object, an embodiment of the present disclosure provides a multimedia data stream processing logic based on a centralized scheduling device. In the embodiment of the disclosure, the terminal device is not required to integrate the control logic of the SDK, and may communicate with edge resource nodes of different developers through a universal communication protocol to obtain the multimedia data stream for playing. According to this technical concept, an embodiment of the present disclosure provides a multimedia data stream processing method. FIG. 1 shows a schematic diagram of a scheduling system architecture which may be applied to the method, including a slicing service 101, a Content Delivery Network (CDN) node 102, a plurality of PCDN nodes 103 (i.e., edge resource nodes), a centralized scheduling device 104, and a terminal device 105.

The slicing service 101 is substantially configured to perform slicing processing on the received multimedia data stream, slice the received multimedia data stream into slices of 1 KB, number each slice, use the number of each slice as a unique identifier of the slice, and form a slice stream with all the sliced slices. It should be noted that the slice size is not limited to 1 KB, and the slicing may be performed according to actual requirements.

The CDN node 102 is configured to segment the multimedia data stream into a plurality of sub-streams based on the slices, where each sub-stream includes a part of the slices of the multimedia data stream, that is, the terminal device does not normally play the multimedia data stream until obtains all the sub-streams of the same multimedia data stream.

Each PCDN node 103 is configured to provide at least one sub-stream to the terminal device 105.

The centralized scheduling device 104 is configured to implement the control logic of the multimedia data stream.

The terminal device 105 is configured to acquire and play the multimedia data stream. The control of the multimedia data stream by the original SDK is implemented by the centralized scheduling device 104. A new set of centralized control logic is provided in the embodiment of the present disclosure to fully utilize the edge resource nodes.

It should be noted that the slicing service 101, the CDN node 102, the PCDN node 103 and the centralized scheduling device 104 in the embodiment of the present disclosure may be implemented as a server.

Figure 2:
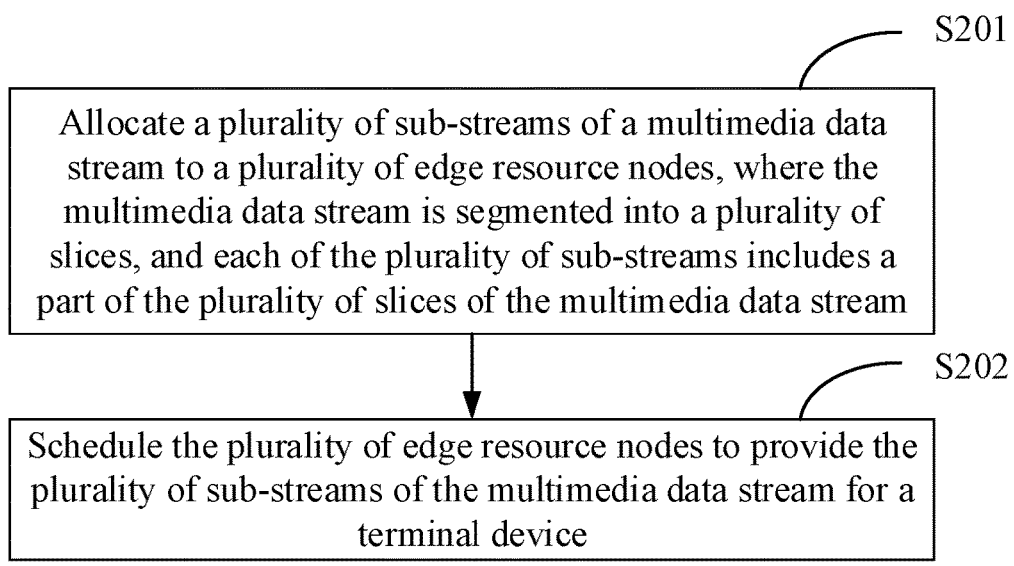
FIG. 2 is a flow chart diagram of a multimedia data stream processing method according to an embodiment of the present disclosure.

FIG. 2 shows a flow chart diagram of a multimedia data stream processing method implemented by a centralized scheduling device according to an embodiment of the present disclosure, including the followings.

In S201, a plurality of sub-streams of a multimedia data stream are allocated to a plurality of edge resource nodes, where the multimedia data stream is segmented into a plurality of slices, and each sub-stream includes a part of the plurality of slices of the multimedia data stream.

For example, the slicing service 101 slices the multimedia data stream upon receiving the multimedia data stream, and each slice has a corresponding slice number. The slices are allocated into respective sub-streams by the CDN node. Assuming that a multimedia data stream is segmented into n sub-streams, and each sub-stream has a corresponding sub-stream number. Sub-stream number=slice number % the number of sub-streams (n), that is, the sub-stream to which each slice pertains is determined by a modulo result of the slice number with respect to the number n of sub-streams. For example, when the modulo result of the slices numbered 1, 3, 5, and 7 is 1, the slices numbered 1, 3, 5, and 7 are allocated to sub-stream 1, when the modulo result of the slices numbered 2, 4, and 6 is 2, the slices numbered 2, 4, and 6 are allocated to sub-stream 2, and so on. As can be seen, in the embodiment of the disclosure, each sub-stream includes a part of the plurality of slices of the multimedia data stream. In implementation, different sub-streams may include different slices of the multimedia data stream. Such an allocation mode has a low performance requirement on the edge resource node. Of course, the same slice may be allocated to multiple sub-streams, which may be selected according to the situation in implementation.

Accordingly, each edge resource node may carry one or more sub-streams of the same multimedia data stream when the centralized scheduling device 104 allocates the sub-streams to the edge resource nodes.

In S202, the plurality of edge resource nodes are scheduled to provide the plurality of sub-streams of the multimedia data stream for a terminal device.

In the embodiment of the disclosure, the multimedia data stream is segmented into the plurality of sub-streams. The different sub-streams include a part of the plurality of slices of the multimedia data stream, and the plurality of edge resource nodes collectively carry the same multimedia data stream. Such an allocation mode has a low performance requirement on the edge resource node and may comply with the characteristics of the edge resources. The fragment bandwidth and the computing power of the plurality of edge resource nodes may be fully utilized to provide the multimedia data stream for the same terminal device. Moreover, the scheduling control of the multimedia data stream is realized at the service end in a centralized manner, and the terminal device may not integrate the SDK of the cloud service anymore, thereby relieving the resource configuration burden of the terminal device. As the SDK does not need to be integrated, the terminal device may communicate with different cloud services by adopting a universal communication protocol. For the terminal device, various cloud services may be communicated and are not independent. In addition, the different devices may communicate with each other by adopting an http/3 protocol to receive and transmit related requests, thereby facilitating the communication of intranet nodes without a public network IP with other devices, lowering communication threshold, and expanding an applicable range of a P2P/PCDN system.

In the embodiment of the present disclosure, in order to reasonably allocate the plurality of sub-streams of the multimedia data stream, the allocating of the plurality of sub-streams of the multimedia data stream to the plurality of edge resource nodes may be implemented as follows.

An edge resource node of which a load condition satisfies a preset requirement is screened out from an edge resource node set as an edge resource node to be allocated.

Here, the load condition may reflect whether the edge resource node has an ability to load the sub-streams and provide the corresponding services, and the load condition may include an idleness of the edge resource node and an occupation of the edge resource node, for example. The idleness of the edge resource node may be further subdivided into a case that the edge resource node is idle and has sufficient residual space, and a case that the edge resource node is idle and has insufficient residual space. When the edge resource node is idle and has the sufficient residual space, it is determined that the preset requirement is met. Further, the edge resource nodes satisfying the preset requirement are screened out from the edge resource node set and used as the edge resource nodes to be allocated for carrying the sub-streams of the related multimedia data stream.

Secondly, the multimedia data stream is subjected to correlated processing, and a sub-stream to be allocated that is not allocated to an edge resource node is determined in the plurality of sub-streams.

For a multimedia data stream, firstly it is sliced. Then the CDN node stores all the sliced slices with a size of a single slice as a unit. For the slices of the same multimedia data stream, the CDN node continues to segment the sub-streams. Each sub-stream includes a part of the slices of the multimedia data stream, and all of the sub-streams may cover all of the slices of the multimedia data stream. After the sub-streams are segmented, the sub-stream in the segmented sub-streams to which the edge resource node is not allocated is determined as the sub-stream to be allocated. Subsequently, the sub-stream to be allocated is allocated to the edge resource node to be allocated based on a preset allocation rule.

Here, the preset allocation rule includes allocating a sub-stream to an edge resource node, that is, different edge resource nodes carry different sub-streams, such that the resources of the edge resource nodes may be saved and the utilization rate of the edge resource nodes may be improved. Of course, the same sub-stream may also be allocated to multiple edge resource nodes, and the disclosure is not particularly limited.

In the embodiment of the present disclosure, after the edge resource node to be allocated and the sub-stream to be allocated are determined, each sub-stream to be allocated is allocated to a corresponding edge resource node to be allocated according to the preset allocation rule, thereby effectively achieving the load balancing of different edge resource nodes and improving the utilization rate of the edge resource nodes.

After the edge resource nodes carry the corresponding sub-streams, the plurality of sub-streams generated by the multimedia data stream are carried at a plurality of PCDN nodes at this time, and those sub-streams may be provided to the terminal device at any time. Here, the scheduling of the edge resource nodes to provide the sub-streams of the multimedia data stream for the terminal device may be implemented as follows.

The centralized scheduling device receives a Hyper Text Transfer Protocol (HTTP) request for the multimedia data stream sent by the terminal device.

When generating a demand on play, the terminal device sends an HTTP play request to the centralized scheduling device. At this moment, the target object to be sent is the centralized scheduling device, and the SDK is not required to be sent to the edge resource node. In the embodiment of the disclosure, the received HTTP requests are uniformly processed by the centralized scheduling device.

In response to the HTTP request of the terminal device, the centralized scheduling device determines the edge resource nodes carrying the multimedia data stream, and determines a CDN node carrying the multimedia data stream.

After receiving the HTTP request from the terminal equipment, the centralized scheduling device responds to the HTTP request. At this time, the centralized scheduling device may control the edge resource nodes to provide the sub-streams carried by the edge resource nodes to the terminal device for play thereon. Meanwhile, the centralized scheduling device further needs to determine the CDN node carrying the multimedia data stream, at which all the slices of the multimedia data stream are included.

After determining the edge resource nodes and CDN node of the multimedia data stream, the centralized scheduling device generates response information and sends the response information to the terminal device. The response information includes address information of the plurality of edge resource nodes and address information of the CDN node. The CDN node is used by the terminal device to acquire play-starting data, and the edge resource nodes are used by the terminal device to acquire data following the play-starting data in the multimedia data stream.

The terminal device may be connected with the CDN node, and may be also connected with each edge resource node based on the addresses of the edge resource nodes. As shown in FIG. 1, the terminal device acquires the play-starting data from the CDN node, and when the CDN node finishes the providing of the play-starting data for the terminal device, the terminal device disconnects the connection with the CDN node and acquires the data following the play-starting data from the edge resource nodes.

In an implementation of the embodiment of the present disclosure, a series of consecutive actions for scheduling the multimedia data stream based on the HTTP request are all implemented by a server. Based on a universal communication protocol between the terminal device and the server, the server uniformly processes the request and receives/transmits information, thereby simplifying the original communication process and improving the processing efficiency of the multimedia data stream.

To assist the centralized scheduling device in managing various edge resource nodes, in the embodiment of the present disclosure, each edge resource node may report state information to the centralized scheduling device. The centralized scheduling device may receive the state information reported from the plurality of edge resource nodes. The edge resource nodes may be then scheduled based on the state information to provide the sub-streams of the multimedia data stream to the terminal device.

In an implementation of the embodiment of the present disclosure, the received state information reported by the multiple edge resource nodes is used as a basis for scheduling the plurality of edge resource nodes, and thus, the scheduling logic is strict and reliable. The state of each edge resource may be known based on the state information such that the edge resource nodes may be reasonably scheduled. Therefore, it is possible to avoid a case that the terminal device cannot normally acquire the multimedia data stream since the edge resource nodes are not suitable for providing services, thereby improving the service efficiency.

For convenience of description, any one edge resource node reporting the state information is hereinafter referred to as a first edge resource node. For the first edge resource node, the reported state information includes at least one of the following items.

1) Data Transmission Condition of an Upstream Node of the First Edge Resource Node As shown in FIG. 1, the upstream node of the first edge resource node may be a CDN node or a PCDN node.

The first edge resource node may receive the data transmitted from the upstream node. When the data reception is slow (for example, it could be understood as slow data reception when a data receiving rate is lower than a preset rate), the first edge resource node may determine that the data transmission from the upstream node is slow and this will be reported to the centralized scheduling device.

2) Data Transmission Condition of a Downstream Node of the First Edge Resource Node As shown in FIG. 1, the downstream node may include a PCDN node or a terminal device.

Similarly, the first edge resource node may send data to the downstream node. When a sending rate of the first edge resource node is normal but a feedback from the downstream node is slow, it may mean that a data receiving rate of the downstream node is low, and this will be reported to the centralized scheduling device.

3) Data Transmission Condition and Load Condition of the First Edge Resource Node For example, when the first edge resource node sends data, the data is sent based on a sending queue. If the data in the sending queue is overstocked, the data cannot be sent out for a long time or the sending rate is low, this will be reported the centralized scheduling device to inform that a problem occurs in the sending link of the first edge resource node.

Similarly, the first edge resource node receives data transmitted from the upstream node based on the receiving queue. When the receiving queue receives a low amount of data in unit time, does not receive data for a long time or receives a small amount of data, it could be understood that a problem occurs in the data reception, and this will be reported to the centralized scheduling device.

The reported data transmission condition may include relatively slow data link transmission, inability to transmit data, and the like. When these conditions occur, the first edge resource node may analyze whether a failure occurs in data transmission by the upstream node or the downstream node, or whether a problem occurs in data reception by the first edge resource node. Any of reasons may adversely affect the efficiency of data transmission in the overall system. But by this way, a response could be timely made to the generated adverse influence, that is, the state information may be reported to the centralized scheduling device, which assists the centralized scheduling device in analyzing the state information for actively coping and processing, thereby effectively preventing the whole system from the data transmission failure and the inability to operate, and improving the running stability of the system and the service efficiency.

In summary, the reporting of the transmission condition of the upstream node may allow the centralized scheduling device to comprehensively and timely know the conditions of different nodes and avoid condition information loss caused by the fact that the upstream node fails to report the condition of the upstream node. Similarly, the reporting of the data transmission condition of the downstream node may allow the centralized scheduling device to comprehensively and timely know the condition of the downstream node and avoid the fact that the downstream node fails to report the condition of the downstream node. The reporting of the condition of the first edge resource node may assist in knowing the specific condition of the first edge resource node so as to manage and schedule each of the edge resource nodes.

In some embodiments, the centralized scheduling device may analyze a health status of the first resource node based on the state information reported by the first resource node, and the centralized scheduling device may determine a target sub-stream carried by the first edge resource node when it is determined that the first edge resource node has a failure based on the state information of the first edge resource node.

Here, in the determination method of the target sub-stream, it may be determined according to its unique sub-stream number. The centralized scheduling device may maintain a sub-stream distribution list carried by each edge resource node, as shown in Table 1. Table 1 records that an edge resource node 1 carries a sub-stream A1 of a multimedia data stream A, an edge resource node 2 carries a sub-stream A2 of the multimedia data stream A, and an edge resource node 3 carries a sub-stream B1 of a multimedia data stream B, and so on. The sub-stream conditions provided by each edge resource node may be known based on the maintained sub-stream distribution list. It should be noted that Table 1 is only used for illustrating the sub-stream distribution list and is not used for limiting embodiments of the present disclosure. In practice, each multimedia data stream distribution may have a corresponding sub-stream distribution list, which may be also shown as Table 1. The sub-stream distribution of multiple multimedia data streams may be recorded in one sub-stream distribution list.

TABLE 1

| Edge resource node identifier | Multimedia data stream A | Multimedia data stream B |
|---|---|---|
| Edge resource node 1 | Sub-stream A1 | |
| Edge resource node 2 | Sub-stream A2 | |
| Edge resource node 3 | | Sub-stream B1 |
| . . . | . . . | . . . |

Since one or more sub-streams of the multimedia data stream may be carried in the same edge resource node, the target sub-stream determined in the embodiment of the present disclosure may be one sub-stream or a plurality of sub-streams of the multimedia data stream. The centralized scheduling device may screen out a second edge resource node to carry the target sub-stream. Then, the second edge resource node is scheduled to provide the target sub-stream for the terminal device.

After confirming the target sub-stream, the centralized scheduling device needs to screen out the second edge resource node capable of carrying the target sub-stream in the place of the function of the first edge resource node in the case where the first edge resource node carrying the target sub-stream fails. It can be understood that the second edge resource node should have the functions of the normal first edge resource node and the capability of carrying the target sub-stream.

In some embodiments, to save storage resources of the edge resource nodes, each sub-stream may be carried by only one edge resource node. When a problem occurs in the edge resource node, another edge resource node carrying the sub-stream may be re-selected. Under the control of the centralized scheduling device, the re-selected edge resource node requests an upstream node to acquire the sub-stream, and then provides the acquired sub-stream to the terminal device. After the edge resource node has been replaced, the centralized scheduling device may send the terminal device a replacement notification which includes an address of the new replacement edge resource node and the sub-stream provided by the new replacement edge resource node, such that the terminal device is allowed to establish a connection with the new replacement edge resource node and acquire the sub-stream. In the embodiment, only when the first edge resource node fails to carry the corresponding sub-stream, the replacement second edge resource node is scheduled to be the place of the failed first edge resource node, thereby saving the space resource of the edge resource nodes, improving the efficiency of the system operation, and fulfilling the data transmission requirement.

In the embodiment of the present disclosure, after it is determined that the first edge resource node is not able to carry the target sub-stream, the failed first edge resource node can be replaced in time and the second edge resource node that can carry the target sub-stream is continuously employed to complete the corresponding function. Therefore, it is possible to ensure that the sub-stream may be provided to the terminal device by way of scheduling even when the same sub-stream has a problem, and that the terminal device can acquire the multimedia data stream in time for playing.

Figure 3:
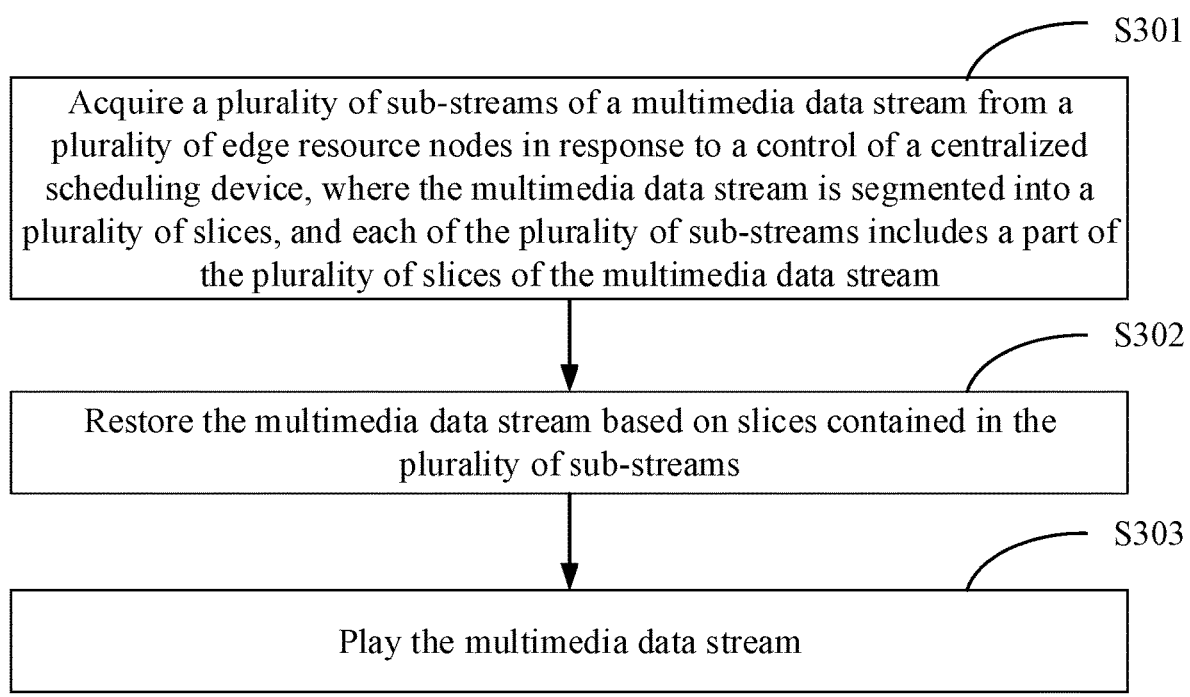
FIG. 3 is a flow chart diagram of a multimedia data stream processing method according to another embodiment of the present disclosure.

Described above is the processing method of the multimedia data stream carried out by the centralized scheduling device. Based on the same technical concept, as shown in FIG. 3, an embodiment of the present disclosure further provides a processing method of the multimedia data stream implemented by a terminal device, including the followings.

In S301, a plurality of sub-streams of a multimedia data stream are acquired from a plurality of edge resource nodes in response to a control of a centralized scheduling device, where the multimedia data stream is segmented into a plurality of slices, and each of the plurality of sub-streams includes a part of the plurality of slices of the multimedia data stream.

How to slice and how to allocate the slices to the corresponding sub-streams have been described above, and thus the detailed description thereof will be omitted here.

It should be noted that each terminal device may obtain the sub-streams of the same multimedia data stream from each edge resource node.

In S302, the multimedia data stream is restored based on slices contained in the plurality of sub-streams.

Based on the slices contained in the plurality of sub-streams, the slices contained in the obtained sub-streams are arranged completely in an order based on the slice numbers to restore the multimedia data stream to be played. The terminal device may then decode the multimedia data stream to obtain a playable multimedia data stream.

In S303, the multimedia data stream is played.

In the embodiment of the disclosure, the terminal device receives the sub-streams provided by multiple PCDN nodes directly in response to the control of the centralized scheduling device, and restores the received slices contained in the sub-streams into the multimedia data stream. After the restoration is completed, the multimedia data stream may be played on the terminal device. Therefore, according to the embodiment of the present disclosure, the terminal device can adopt a universal communication protocol to communicate with different cloud services without integrating the SDK. For the terminal device, various cloud services may be communicated with each other and are dependent each other. The scheduling control of the multimedia data stream is realized in a centralized mode at the service end, such that the terminal device may not integrate the SDK of the cloud service any more, thereby relieving the resource configuration burden of the terminal device and improving the efficiency of acquiring the multimedia data stream by the terminal device.

The acquiring of the plurality of sub-streams of the multimedia data stream from the plurality of edge resource nodes in response to the control of the centralized scheduling device, may be implemented as follows.

The terminal device sends an HTTP request for the multimedia data stream to the centralized scheduling device.

When the terminal device generates a demand on play, the terminal device sends an HTTP play request to the centralized scheduling device. At this moment, the target object to be sent is the centralized scheduling device, and the SDK is not required to be sent to the edge resource node. In the embodiment of the disclosure, the received HTTP requests are uniformly processed by the centralized scheduling device.

The terminal device receives response information sent from the centralized scheduling device, where the response information includes address information of the plurality of edge resource nodes and address information of a Content Distribution Network (CDN) node.

The terminal device acquires play-starting data of the multimedia data stream from the CDN node based on the address information of the CDN node.

The terminal device acquires data following the play-starting data in the multimedia data stream from the plurality of edge resource nodes based on the address information of the plurality of edge resource nodes.

In an implementation of the embodiment of the present disclosure, the control logic for obtaining the live stream based on the HTTP request is completed in a centralized mode by the centralized scheduling device. The terminal device may play the multimedia data stream based on the universal communication protocol. There is no need for the terminal device to integrate the SDK, thereby reducing the configuration burden of the terminal device.

In the embodiment of the present disclosure, the terminal device acquires the slices included in the plurality of sub-streams based on the control of the centralized scheduling device and restores the multimedia data stream, which can be implemented as follows: when it is determined based on the slices contained in the plurality of sub-streams that the multimedia data stream loses a slice, as shown in FIG. 1, the terminal device acquires the lost slice from the CDN node. The multimedia data stream is restored based on the lost slice.

When acquiring the slices, the terminal device arranges the slices according to the slice numbers. If the slice numbers after arrangement are discontinuous, the acquired multimedia data stream may have lost the slice(s). For example, the slices of the multimedia data stream include five slices Nos. 1, 2, 3, 4, and 5, but the terminal device only acquires slices Nos 1, 2, and 4 without slices Nos 3 and 5. At this time, the terminal device comes into a connection with the CDN node again, and upon the successful connection, the lost slices Nos. 3 and 5 may be acquired from the CDN node to ensure that the finally acquired multimedia data stream is complete. After acquiring, based on the lost slices, the corresponding lost slices from the CDN node, the terminal device supplements the newly acquired slices into the multimedia data stream according to the slice numbers to restore the multimedia data stream. The restored multimedia data stream may be played at the terminal device.

In the embodiment of the present disclosure, even though a slice is lost when the terminal device acquires the sub-stream from the edge resource node, the lost slice may be quickly supplemented based on the CDN node, thereby improving the efficiency of acquiring the multimedia data stream by the terminal device.

Figure 4:
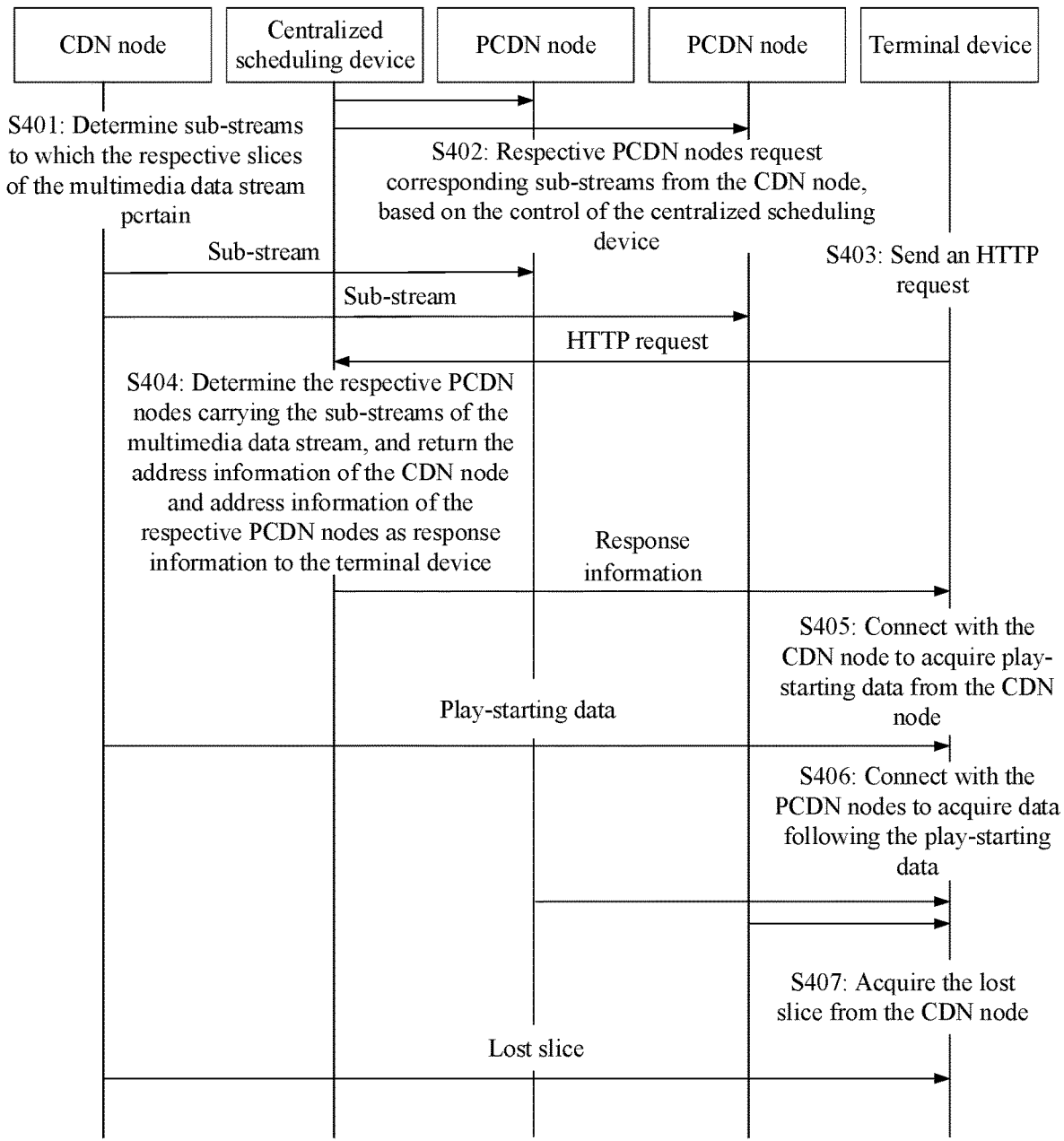
FIG. 4 is a flow chart diagram of a multimedia data stream processing method according to another embodiment of the present disclosure.

To facilitate a systematic understanding of the multimedia data stream processing method according to the embodiment of the present disclosure, the description will be made with reference to FIG. 4, which includes the followings.

In S401, the CDN node determines sub-streams to which the respective slices of the multimedia data stream pertain.

In S402, the respective PCDN nodes request corresponding sub-streams from the CDN node, based on the control of the centralized scheduling device.

In S403, the terminal device sends an HTTP request to the centralized scheduling device.

In S404, the centralized scheduling device receives the HTTP request sent from the terminal device, determines the respective PCDN nodes carrying the sub-streams of the multimedia data stream, and returns the address information of the CDN node and address information of the respective PCDN nodes as response information to the terminal device.

In S405, the terminal device connects with the CDN node to acquire play-starting data from the CDN node.

In S406, the terminal device connects with the PCDN nodes to acquire data following the play-starting data.

In S407, the terminal device connects with the CDN node again in the case where the terminal device has a lost slice, to acquire the lost slice from the CDN node.

Figure 5:
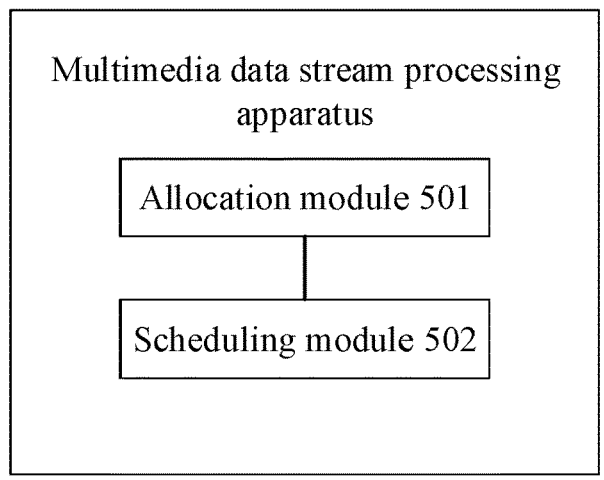
FIG. 5 is a schematic diagram illustrating a structure of a multimedia data stream processing apparatus according to an embodiment of the present disclosure.

Based on the same technical concept, an embodiment of the present disclosure further provides a multimedia data stream processing apparatus, as shown in FIG. 5, including: an allocation module 501, configured to allocate a plurality of sub-streams of a multimedia data stream to a plurality of edge resource nodes, where the multimedia data stream is segmented into a plurality of slices, and each of the plurality of sub-streams includes a part of the plurality of slices of the multimedia data stream; and a scheduling module 502, configured to schedule the plurality of edge resource nodes to provide the plurality of sub-streams of the multimedia data stream for a terminal device.

In some embodiments, the allocation module 501 includes: a first screening sub-module, configured to screen out an edge resource node of which a load condition satisfies the preset requirement from an edge resource node set as an edge resource node to be allocated; a first determining sub-module, configured to determine a sub-stream to be allocated that is not allocated to an edge resource node in the plurality of sub-streams; and an allocation sub-module, configured to allocate the sub-stream to be allocated to the edge resource node to be allocated based on a preset allocation rule.

In some embodiments, the scheduling module 502 includes: a first receiving sub-module, configured to receive a Hyper Text Transfer Protocol (HTTP) request for the multimedia data stream sent by the terminal device; a second determining sub-module, configured to determine the plurality of edge resource nodes carrying the multimedia data stream and determines a Content Distribution Network (CDN) node carrying the multimedia data stream in response to the HTTP request of the terminal device; a generating sub-module, configured to generate response information including address information of the plurality of edge resource nodes and address information of the CDN node, where the CDN node is used by the terminal device to acquire play-starting data, and the plurality of edge resource nodes are used by the terminal device to acquire data following the play-starting data in the multimedia data stream; and a sending sub-module, configured to send the response information to the terminal device.

In some embodiments, the scheduling module 502 includes: a second receiving sub-module, configured to receive state information reported from the plurality of edge resource nodes; and a first scheduling sub-module, configured to schedule the plurality of edge resource nodes to provide the plurality of sub-streams of the multimedia data stream to the terminal device based on the state information.

In some embodiments, for a first edge resource node which is any one of the plurality of edge resource nodes, the state information includes at least one of: a data transmission condition of an upstream node of the first edge resource node; a data transmission condition of a downstream node of the first edge resource node; or a data transmission condition and load condition of the first edge resource node.

In some embodiments, the scheduling sub-module is configured to: determine a target sub-stream carried by the first edge resource node, in the case where it is determined, based on the state information of the first edge resource node, that the first edge resource node has a failure; screen out a second edge resource node to carry the target sub-stream; and schedule the second edge resource node to provide the target sub-stream for the terminal device.

Figure 6:
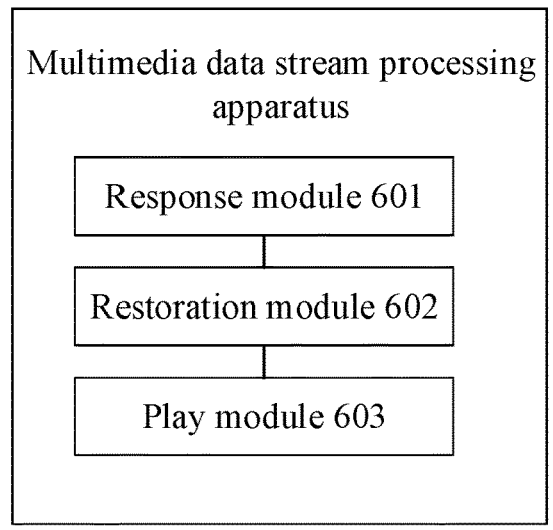
FIG. 6 is a schematic diagram illustrating a structure of a multimedia data stream processing apparatus according to another embodiment of the present disclosure.

Based on the same technical concept, an embodiment of the present disclosure further provides a multimedia data stream processing apparatus, as shown in FIG. 6, including: a response module 601, configured to acquire a plurality of sub-streams of a multimedia data stream from a plurality of edge resource nodes in response to the control of a centralized scheduling device, where the multimedia data stream is segmented into a plurality of slices, and each of the plurality of sub-streams includes a part of the plurality of slices of the multimedia data stream; a restoration module 602, configured to restore the multimedia data stream based on the plurality of slices contained in the plurality of sub-streams; and a playing module 603, configured to play the multimedia data stream.

In some embodiments, the response module 601 includes: a sending sub-module, configured to send a Hyper Text Transfer Protocol (HTTP) request for the multimedia data stream to the centralized scheduling device; a receiving sub-module, configured to receive response information sent from the centralized scheduling device, where the response information includes address information of the plurality of edge resource nodes and address information of a Content Distribution Network (CDN) node; a first acquisition sub-module, configured to acquire play-starting data of the multimedia data stream from the CDN node based on the address information of the CDN node; and a second acquisition sub-module, configured to acquire data following the play-starting data in the multimedia data stream from the plurality of edge resource nodes based on the address information of the plurality of edge resource nodes.

In some embodiments, the restoration module 602 includes: a third acquisition sub-module, configured to acquire, when it is determined based on the plurality of slices included in the plurality of sub-streams that the multimedia data stream loses a slice, the lost slice from the CDN node; and a restoration sub-module, configured to restore the multimedia data stream based on the lost slice.

For the description of specific functions and examples of each module and each sub-module of the apparatus in the embodiment of the present disclosure, reference may be made to the related description of the corresponding steps in the foregoing method embodiments, and the details will not be repeated here.

According to embodiments of the present disclosure, the present disclosure also provides an electronic device, a readable storage medium and a computer program product.

Figure 7:
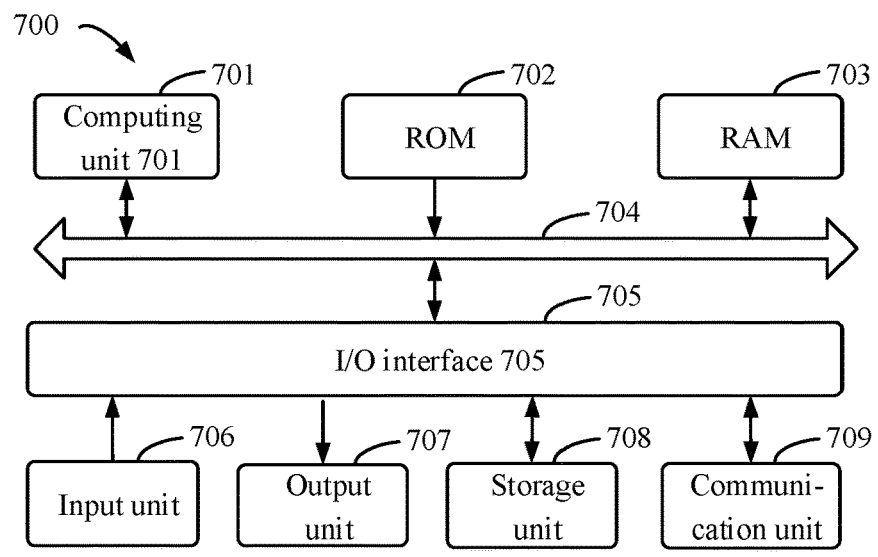
FIG. 7 is a block diagram of an electronic device for implementing a multimedia data stream processing method according to an embodiment of the present disclosure.

FIG. 7 shows a schematic block diagram of an exemplary electronic device 700 that may be used to implement embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as personal digital processing, a cellular phone, a smart phone, a wearable device and other similar computing devices. The components shown herein, their connections and relationships, as well as their functions are merely examples, and are not intended to limit implementations of the present disclosure described and/or required herein.

As shown in FIG. 7, the electronic device 700 includes a computing unit 701 that may perform various appropriate actions and processes according to a computer program stored in a Read-Only Memory (ROM) 702 or a computer program loaded from a storage unit 708 into a Random Access Memory (RAM) 703. Various programs and data required for an operation of the electronic device 700 may also be stored in the RAM 703. The computing unit 701, ROM 702 and RAM 703 are connected to each other through a bus 704. The input/output (I/O) interface 705 is also connected to the bus 704.

A plurality of components in the electronic device 700 are connected to the I/O interface 705, and include an input unit 706 such as a keyboard, a mouse, or the like, an output unit 707 such as various types of displays, speakers, or the like, the storage unit 708 such as a magnetic disk, an optical disk, or the like; and a communication unit 709 such as a network card, a modem, a wireless communication transceiver, or the like. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 701 performs various methods and processing described above, such as the above multimedia data stream processing method. For example, in some embodiments, the above multimedia data stream processing method may be implemented as a computer software program that is tangibly contained in a computer-readable medium, such as the storage unit 708. In some embodiments, a part or all of the computer program may be loaded and/or installed on the electronic device 700 via ROM 702 and/or the communication unit 709. When the computer program is loaded into RAM 703 and executed by the computing unit 701, one or more steps of the multimedia data stream processing method described above may be performed. Alternatively, in other embodiments, the computing unit 701 may be configured to perform the above multimedia data stream processing method by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Products (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system including a back-end component (e.g., as a data server), or in a computing system including a middleware (e.g., as an application server), or in a computing system including a front-end component (e.g., as a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and the server are generally far away from each other and usually interact with each other through a communication network. A relationship between the client and the server is generated by computer programs running on corresponding computers and having a client-server relationship with each other. The server may be a cloud server, a distributed system server, or a blockchain server.

It should be understood that, the steps may be reordered, added or removed by using various forms of the flows described above. For example, the steps recorded in the present disclosure can be performed in parallel, in sequence, or in different orders, as long as a desired result of the technical solution disclosed in the present disclosure can be realized, which is not limited herein.

The foregoing specific implementations do not constitute a limitation to the protection scope of the present disclosure. Those having ordinary skill in the art should understand that, various modifications, combinations, sub-combinations and substitutions may be made according to a design requirement and other factors. Any modification, equivalent replacement, improvement or the like made within the spirit and principle of the present disclosure should be included in the protection scope of the present disclosure.

What is claimed is:

1. A multimedia data stream processing method, comprising:
    allocating a plurality of sub-streams of a multimedia data stream to a plurality of edge resource nodes, wherein the multimedia data stream is segmented into a plurality of slices, and each of the plurality of sub-streams includes a part of the plurality of slices of the multimedia data stream; and
    scheduling the plurality of edge resource nodes to provide the plurality of sub-streams of the multimedia data stream for a terminal device, comprising:
        receiving a Hyper Text Transfer Protocol (HTTP) request for the multimedia data stream sent by the terminal device;
        determining the plurality of edge resource nodes carrying the multimedia data stream and a Content Delivery Network (CDN) node carrying the multimedia data stream, in response to the HTTP request of the terminal device;
        generating response information including address information of the plurality of edge resource nodes and address information of the CDN node, wherein the CDN node is used by the terminal device to acquire play-starting data, and the plurality of edge resource nodes are used by the terminal device to acquire data following the play-starting data in the multimedia data stream; and
        sending the response information to the terminal device.

2. The method of claim 1, wherein allocating the plurality of sub-streams of the multimedia data stream to the plurality of edge resource nodes, comprises:
    screening out an edge resource node of which a load condition satisfies a preset requirement from an edge resource node set, as an edge resource node to be allocated;
    determining a sub-stream to be allocated that is not allocated to an edge resource node in the plurality of sub-streams; and
    allocating the sub-stream to be allocated to the edge resource node to be allocated based on a preset allocation rule.

3. The method of claim 2, wherein scheduling the plurality of edge resource nodes to provide the plurality of sub-streams of the multimedia data stream for the terminal device, comprises:
receiving state information reported by the plurality of edge resource nodes; and
scheduling the plurality of edge resource nodes to provide the plurality of sub-streams of the multimedia data stream to the terminal device based on the state information.

4. The method of claim 3, wherein for a first edge resource node which is any one of the plurality of edge resource nodes, the state information comprises at least one of:
a data transmission condition of an upstream node of the first edge resource node;
a data transmission condition of a downstream node of the first edge resource node; or
a data transmission condition and load condition of the first edge resource node.

5. The method of claim 3, wherein scheduling the plurality of edge resource nodes to provide the plurality of sub-streams of the multimedia data stream to the terminal device based on the state information, comprises:
determining a target sub-stream carried by a first edge resource node, in a case of it is determined, based on the state information of the first edge resource node, that the first edge resource node has a failure;
screening out a second edge resource node to carry the target sub-stream; and
scheduling the second edge resource node to provide the target sub-stream for the terminal device.

6. The method of claim 1, wherein scheduling the plurality of edge resource nodes to provide the plurality of sub-streams of the multimedia data stream for the terminal device, comprises:
receiving state information reported by the plurality of edge resource nodes; and
scheduling the plurality of edge resource nodes to provide the plurality of sub-streams of the multimedia data stream to the terminal device based on the state information.

7. The method of claim 6, wherein for a first edge resource node which is any one of the plurality of edge resource nodes, the state information comprises at least one of:
a data transmission condition of an upstream node of the first edge resource node;
a data transmission condition of a downstream node of the first edge resource node; or
a data transmission condition and load condition of the first edge resource node.

8. The method of claim 6, wherein scheduling the plurality of edge resource nodes to provide the plurality of sub-streams of the multimedia data stream to the terminal device based on the state information, comprises:
determining a target sub-stream carried by a first edge resource node, in a case of it is determined, based on the state information of the first edge resource node, that the first edge resource node has a failure;
screening out a second edge resource node to carry the target sub-stream; and
scheduling the second edge resource node to provide the target sub-stream for the terminal device.

9. An electronic device, comprising:
at least one processor; and
a memory connected in communication with the at least one processor;
wherein the memory stores an instruction executable by the at least one processor, and the instruction, when executed by the at least one processor, enables the at least one processor to execute operations, comprising:
allocating a plurality of sub-streams of a multimedia data stream to a plurality of edge resource nodes, wherein the multimedia data stream is segmented into a plurality of slices, and each of the plurality of sub-streams includes a part of the plurality of slices of the multimedia data stream; and
scheduling the plurality of edge resource nodes to provide the plurality of sub-streams of the multimedia data stream for a terminal device, comprising:
receiving a Hyper Text Transfer Protocol (HTTP) request for the multimedia data stream sent by the terminal device;
determining the plurality of edge resource nodes carrying the multimedia data stream and a Content Delivery Network (CDN) node carrying the multimedia data stream, in response to the HTTP request of the terminal device;
generating response information including address information of the plurality of edge resource nodes and address information of the CDN node, wherein the CDN node is used by the terminal device to acquire play-starting data, and the plurality of edge resource nodes are used by the terminal device to acquire data following the play-starting data in the multimedia data stream; and
sending the response information to the terminal device.

10. The electronic device of claim 9, wherein allocating the plurality of sub-streams of the multimedia data stream to the plurality of edge resource nodes, comprises:
screening out an edge resource node of which a load condition satisfies a preset requirement from an edge resource node set, as an edge resource node to be allocated;
determining a sub-stream to be allocated that is not allocated to an edge resource node in the plurality of sub-streams; and
allocating the sub-stream to be allocated to the edge resource node to be allocated based on a preset allocation rule.

11. The electronic device of claim 10, wherein scheduling the plurality of edge resource nodes to provide the plurality of sub-streams of the multimedia data stream for the terminal device, comprises:
receiving state information reported by the plurality of edge resource nodes; and
scheduling the plurality of edge resource nodes to provide the plurality of sub-streams of the multimedia data stream to the terminal device based on the state information.

12. The electronic device of claim 9, wherein scheduling the plurality of edge resource nodes to provide the plurality of sub-streams of the multimedia data stream for the terminal device, comprises:
receiving state information reported by the plurality of edge resource nodes; and
scheduling the plurality of edge resource nodes to provide the plurality of sub-streams of the multimedia data stream to the terminal device based on the state information.

13. The electronic device of claim 12, wherein for a first edge resource node which is any one of the plurality of edge resource nodes, the state information comprises at least one of:
- a data transmission condition of an upstream node of the first edge resource node;
- a data transmission condition of a downstream node of the first edge resource node; or
- a data transmission condition and load condition of the first edge resource node.

14. The electronic device of claim 12, wherein scheduling the plurality of edge resource nodes to provide the plurality of sub-streams of the multimedia data stream to the terminal device based on the state information, comprises:
- determining a target sub-stream carried by a first edge resource node, in a case of it is determined, based on the state information of the first edge resource node, that the first edge resource node has a failure;
- screening out a second edge resource node to carry the target sub-stream; and
- scheduling the second edge resource node to provide the target sub-stream for the terminal device.

15. A non-transitory computer-readable storage medium storing a computer program thereon, wherein the computer program is capable of being be executed by a processor to execute operations, comprising:
- allocating a plurality of sub-streams of a multimedia data stream to a plurality of edge resource nodes, wherein the multimedia data stream is segmented into a plurality of slices, and each of the plurality of sub-streams includes a part of the plurality of slices of the multimedia data stream; and
- scheduling the plurality of edge resource nodes to provide the plurality of sub-streams of the multimedia data stream for a terminal device, comprising:
  - receiving a Hyper Text Transfer Protocol (HTTP) request for the multimedia data stream sent by the terminal device;
  - determining the plurality of edge resource nodes carrying the multimedia data stream and a Content Delivery Network (CDN) node carrying the multimedia data stream, in response to the HTTP request of the terminal device;
  - generating response information including address information of the plurality of edge resource nodes and address information of the CDN node, wherein the CDN node is used by the terminal device to acquire play-starting data, and the plurality of edge resource nodes are used by the terminal device to acquire data following the play-starting data in the multimedia data stream; and
  - sending the response information to the terminal device.

16. The non-transitory computer-readable storage medium of claim 15, wherein allocating the plurality of sub-streams of the multimedia data stream to the plurality of edge resource nodes, comprises:
- screening out an edge resource node of which a load condition satisfies a preset requirement from an edge resource node set, as an edge resource node to be allocated;
- determining a sub-stream to be allocated that is not allocated to an edge resource node in the plurality of sub-streams; and
- allocating the sub-stream to be allocated to the edge resource node to be allocated based on a preset allocation rule.

17. The non-transitory computer-readable storage medium of claim 16, wherein scheduling the plurality of edge resource nodes to provide the plurality of sub-streams of the multimedia data stream for the terminal device, comprises:
- receiving state information reported by the plurality of edge resource nodes; and
- scheduling the plurality of edge resource nodes to provide the plurality of sub-streams of the multimedia data stream to the terminal device based on the state information.

18. The non-transitory computer-readable storage medium of claim 15, wherein scheduling the plurality of edge resource nodes to provide the plurality of sub-streams of the multimedia data stream for the terminal device, comprises:
- receiving state information reported by the plurality of edge resource nodes; and
- scheduling the plurality of edge resource nodes to provide the plurality of sub-streams of the multimedia data stream to the terminal device based on the state information.

19. The non-transitory computer-readable storage medium of claim 18, wherein for a first edge resource node which is any one of the plurality of edge resource nodes, the state information comprises at least one of:
- a data transmission condition of an upstream node of the first edge resource node;
- a data transmission condition of a downstream node of the first edge resource node; or
- a data transmission condition and load condition of the first edge resource node.

20. The non-transitory computer-readable storage medium of claim 18, wherein scheduling the plurality of edge resource nodes to provide the plurality of sub-streams of the multimedia data stream to the terminal device based on the state information, comprises:
- determining a target sub-stream carried by a first edge resource node, in a case of it is determined, based on the state information of the first edge resource node, that the first edge resource node has a failure;
- screening out a second edge resource node to carry the target sub-stream; and
- scheduling the second edge resource node to provide the target sub-stream for the terminal device.

* * * * *